(12) United States Patent
Baumann et al.

(10) Patent No.: US 7,524,613 B2
(45) Date of Patent: Apr. 28, 2009

(54) MATERIAL FOR THE TREATMENT OF LITHOGRAPHIC SUBSTRATES AND LITHOGRAPHIC PRINTING PLATES

(75) Inventors: Harald Baumann, Osterode/Harz (DE); Bernd Strehmel, Berlin (DE); Ulrich Fiebag, Nienstadt (DE); Friederike Von Gyldenfeldt, Osterode (DE); Tanja Ebhardt, Osterode (DE); Ulrike Dallmann, Herzberg (DE); Dietmar Frank, Northeim (DE)

(73) Assignee: Kodak Graphic Communications, GmbH, Osterode (DE)

( * ) Notice: Subject to any disclaimer, the term of this patent is extended or adjusted under 35 U.S.C. 154(b) by 94 days.

(21) Appl. No.: 11/813,678

(22) PCT Filed: Jan. 12, 2006

(86) PCT No.: PCT/EP2006/000239

§ 371 (c)(1),
(2), (4) Date: Jul. 11, 2007

(87) PCT Pub. No.: WO2006/077048

PCT Pub. Date: Jul. 27, 2006

(65) Prior Publication Data

US 2008/0206666 A1 Aug. 28, 2008

(30) Foreign Application Priority Data

Jan. 20, 2005 (DE) .................. 10 2005 002 754

(51) Int. Cl.
G03C 1/76 (2006.01)
G03F 7/09 (2006.01)
G03F 7/11 (2006.01)
G03F 7/40 (2006.01)
C08G 77/30 (2006.01)

(52) U.S. Cl. .............. 430/272.1; 430/278.1; 430/944; 430/302; 430/325; 430/326; 430/14; 430/18; 528/30; 528/31; 528/32; 528/33; 528/34; 528/38; 528/43

(58) Field of Classification Search ............... None
See application file for complete search history.

(56) References Cited

U.S. PATENT DOCUMENTS 3,716,569 A  2/1973  Redmore et al. ............ 556/405

FOREIGN PATENT DOCUMENTS

EP  1 260 866  11/2002

*Primary Examiner*—Sin J. Lee
(74) *Attorney, Agent, or Firm*—J. Lanny Tucker (57) ABSTRACT

Phosphono-substituted siloxanes suitable as interlayer material in lithographic substrates and for post-treating developed lithographic printing plates, obtainable by reacting (a) a first organosilicon compound of the general formula (I) and (b) a second organosilicon compound of the general formula (II).

17 Claims, 4 Drawing Sheets

MATERIAL FOR THE TREATMENT OF LITHOGRAPHIC SUBSTRATES AND LITHOGRAPHIC PRINTING PLATES

The present invention relates to a material for the treatment of lithographic substrates and lithographic printing plates, in particular a phosphono-substituted siloxane which is suitable both as an interlayer in lithographic substrates and for post-treating imaged lithographic printing plates. The invention furthermore relates to lithographic substrates with an interlayer consisting of the inventive siloxane, printing plate precursors comprising such a substrate and imaged printing plates that have been subjected to a post-treatment with the inventive siloxane.

The technique of lithographic printing is based on the immiscibility of oil and water, wherein the oily material or the printing ink is preferably accepted by the image area, and the water or fountain solution is preferably accepted by the non-image area. When an appropriately produced surface is moistened with water and a printing ink is applied, the background or non-image area accepts the water and repels the printing ink, while the image area accepts the printing ink and repels the water. The printing ink in the image area is then transferred to the surface of a material such as paper, fabric and the like, on which the image is to be formed. Generally, however, the printing ink is first transferred to an intermediate material, referred to as "blanket", which then in turn transfers the printing ink onto the surface of the material on which the image is to be formed; this technique is referred to as offset lithography.

Usually, a lithographic printing plate precursor (in this context the term "printing plate precursor" refers to a coated printing plate prior to exposure and developing) comprises a radiation-sensitive coating applied onto a substrate, usually on aluminum basis. If a coating reacts to radiation such that the exposed portion becomes so soluble that it is removed during the developing process, the plate is referred to as "positive working". On the other hand, a plate is referred to as "negative working" if the exposed portion of the coating is hardened by the radiation. In both cases, the remaining image area accepts printing ink, i.e. is oleophilic, and the non-image area (background) accepts water, i.e. is hydrophilic. The differentiation between image and non-image areas takes place during exposure. Usually, an aqueous, strongly alkaline developer is used to remove the more soluble portions of the coating.

Independently of the type of material the substrate is made from, e.g. aluminum foils, plastic films or paper, the majority of commercially available printing plate precursors has an aluminum oxide layer on the substrate surface since it exhibits a high degree of mechanical abrasion resistance necessary during the printing process. On the one hand, this oxide layer is already hydrophilic to some degree, which is significant for repelling the printing ink; however, on the other hand, it is so reactive that it can interact with components of the radiation-sensitive layer. The aluminum oxide layer can cover the surface of the substrate completely or partially.

Usually, a substrate, in particular an aluminum substrate with aluminum oxide layer, is provided with a hydrophilic protective layer (also referred to as "interlayer") before the radiation-sensitive layer is applied. This hydrophilic protective layer improves the water acceptance of the (non-printing) background areas of a lithographic printing plate and/or improves the repulsion of the printing ink in these areas. A suitable protective layer also ensures that during developing the soluble portions of the radiation-sensitive layer are removed easily and residue-free from the substrate so that clean background areas are obtained during printing. Without such a residue-free removal, what is referred to as toning would occur during printing, i.e. the background areas would accept printing ink. Without a suitable protective layer, the aluminum layer can be stained by dyes that are present for example as so-called exposure indicators or colorants in the radiation-sensitive layers; furthermore, the correctability of a printing plate can be made more difficult. On the other hand, the adhesion of the image areas on the aluminum oxide layer should not be affected by the hydrophilic layer or should even be improved. The interlayer should also protect the aluminum oxide layer against corrosion during developing with a strongly alkaline developer (pH value >11.5). Otherwise, such an attack would lead to a sludging of the developer bath. The interlayer can be applied to one or both sides of the substrate; depending on the amount that is applied, the surface of the side(s) of the substrate can be fully or only partially covered.

Document DE 25 327 69 A1 describes lithographic printing plate precursors on the basis of negative diazo resins having a sodium silicate interlayer. While the adhesion of the image areas to this interlayer is very good, it has been found that the photosensitivity of these plates is greatly affected by storage at elevated temperatures and humidity. Furthermore, the process of applying the interlayer poses problems, for example, drying of the alkaline sodium silicate solution on parts of the apparatus leads to residues which are hard to remove.

The use of polyvinylphosphonic acid or salts thereof as well as copolymers of vinylphosphonic acid with acrylic monomers as interlayers in lithographic printing plate precursors is e.g. suggested in DE 11 34 093 C, U.S. Pat. No. 4,153,461 and EP 0 537 633 B1. However, such a layer does not provide optimum protection for the aluminum oxide layer so that sludging of the developer takes place; furthermore, such printing plates have a tendency to cause toning after the press is re-started.

For a clean printed image it is necessary that the image areas (i.e. the image-wise remaining coating) accept the printing ink well while the non-image areas (i.e. the image-wise revealed substrate, such as e.g. an aluminum substrate) are not supposed to accept the printing ink. In order to protect the image-wise revealed substrate, such as e.g. an aluminum substrate, against finger prints, the formation of aluminum oxide and corrosion, as well as against mechanical damage such as scratches when the printing plate is mounted onto the printing machine, i.e. in order to maintain and possibly improve the hydrophilicity of the non-image areas, the developed printing plate is usually subjected to a "gumming" treatment (also referred to as "finishing"). Gumming a plate before storage or prior to long periods of downtime on the press ensures that the non-image areas remain hydrophilic and thus toning is prevented. During printing, the rubber layer then has to be able to be removed quickly by the fountain solution used during the printing process so that the image areas are able to accept ink immediately. Gumming solutions have been known for a long time and are often based on gum arabic (e.g. DE 29 26 645 A1).

U.S. Pat. No. 4,880,555 describes a "finisher" for lithographic printing plates comprising maltodextrin prepared by enzymatic hydrolysis, a polyol, hydrocarbons, a mixture of long-chain alcohol and aminated alcohol sulfate, substituted phenoxy poly(oxyethylene)ethanol and an ethanolamine.

U.S. Pat. No. 4,033,919 describes an aqueous gumming solution comprising a polymer which comprises units derived from acrylamide and 1 to 25 wt.-% of units with carboxyl groups. The solution furthermore comprises an acidic material such as phosphonic acid, citric acid and tartaric acid. The documents U.S. Pat. No. 4,143,021 and DE 25 045 94 A1 also describe an aqueous gumming solution comprising a polymer or copolymer on the basis of poly(acrylamide).

Document EP 0 985 546 A1 suggests the use of a compound of the following formula (wherein a and b independently represent an integer from 1 to 50 and R is an alkyl group with 8 to 22 carbon atoms) in a gumming solution for lithographic printing plates or in the fountain solution.

EP 1 260 866 A2 explains that it is possible to rinse the developer used for developing from a lithographic printing plate and to carry out a gumming process at the same time. For this purpose, the printing plate is brought into contact with rinsing water comprising (a) at least one film-forming water-soluble polymer and (b) at least one phosphonic acid derivative

EP 0 943 967 A2 and DE 29 25 363 A1 describe emulsion-type gumming solutions.

It is the object of the present invention to provide a material which is suitable both as an interlayer on lithographic substrates and for post-treating an imaged lithographic printing plate. Another object is to provide a lithographic printing plate with an increased adhesion of the image areas to the substrate, resulting in a higher sensitivity and a lower dot loss during printing, without interfering with the delicate balance between printing ink and water and without causing problems such as toning upon re-starting the press. It is yet another object of the invention to provide a lithographic substrate for printing plate precursors with an excellent protection against corrosion caused by strongly alkaline developers.

As used in the present invention, the term "printing plate precursor" refers to an non-imaged plate (i.e. a plate that has not been image-wise exposed and developed), from which a printing plate is produced by image-wise exposure and optionally developing. As used in the present invention, the term "printing plate" refers to an already imaged plate produced from a printing plate precursor (also referred to as "printing form").

The first object is achieved with a phosphono-substituted siloxane obtainable by reacting (a) a first organosilicon compound of the general formula (I)

wherein $R^1$ is selected from a hydrogen atom, a hydroxy group, a linear or branched $C_1$-$C_{20}$ alkyl, linear or branched $C_2$-$C_{20}$ alkenyl, linear or branched $C_1$-$C_{20}$ alkoxy, linear or branched $C_2$-$C_{20}$ alkinyl, aryl, arylalkyl, alkylaryl, arylalkenyl, alkenylaryl, arylalkinyl, alkinylaryl, acyloxy group and a group —$CHR^6$—$PO_3H_2$, $R^2$ and $R^3$ are independently selected from a hydrogen atom, a linear or branched $C_1$-$C_{20}$ alkyl, linear or branched $C_2$-$C_{20}$ alkenyl, linear or branched $C_2$-$C_{20}$ alkinyl, aryl, arylalkyl, alkylaryl, arylalkenyl, alkenylaryl, arylalkinyl and alkinylaryl, $R^4$ is selected from a hydrogen atom, a linear or branched $C_1$-$C_{20}$ alkyl, linear or branched $C_2$-$C_{20}$ alkenyl, linear or branched $C_2$-$C_{20}$ alkinyl, aryl, arylalkyl, alkylaryl, arylalkenyl, alkenylaryl, arylalkinyl, alkinylaryl group and the group —$CHR^6$—$PO_3H_2$, $R^5$ is selected from a hydrogen atom, a linear or branched $C_1$-$C_{20}$ alkyl, linear or branched $C_2$-$C_{20}$ alkenyl, linear or branched $C_2$-$C_{20}$ alkinyl, aryl, arylalkyl, alkylaryl, arylalkenyl, alkenylaryl, arylalkinyl, alkinylaryl group and the group —$CHR^6$—$PO_3H_2$,

Z represents —$(CR^6R^7)_x$— or arylene, $R^6$ and $R^7$ are independently selected from a hydrogen atom, a linear or branched $C_1$-$C_6$ alkyl, linear or branched $C_2$-$C_6$ alkenyl, linear or branched $C_2$-$C_6$ alkinyl, aryl, arylalkyl, alkylaryl, arylalkenyl, alkenylaryl, arylalkinyl and alkinylaryl group, n is an average value and has a value from 1 to 200 (preferably 1 to 100) and x is an integer from 1 to 100 (preferably 1 to 50, especially preferred 1 to 10), and (b) a second organosilicon compound of the general formula (II)

wherein $Z_1$ represents a spacer or a single bond, $R^8$, $R^9$ and $R^{10}$ are independently selected from H, OH, alkyl, alkenyl, alkinyl, aryl, alkylaryl, aralkyl, aralkenyl, alkenylaryl, aralkinyl, alkinylaryl, acyloxy and alkoxy, with the proviso that at least one of the groups $R^8$, $R^9$ and $R^{10}$ is an alkoxy, acyloxy or OH group, and represents one or more functional groups selected from free-radical polymerizable groups, non-ionic hydrophilic groups, basic groups and combinations thereof.

Unless defined otherwise, the term "alkyl group" as used in the present invention refers to a straight-chain, branched or cyclic saturated hydrocarbon group preferably comprising 1 to 18 carbon atoms, especially preferred 1 to 10 carbon atoms and most preferred 1 to 6 carbon atoms. The alkyl group can optionally comprise one or more substituents (preferably 0 or 1 substituent) selected for example from halogen atoms (fluorine, chlorine, bromine, iodine), CN, $NO_2$, $NR'_2$, $COOR'$ and $OR'$ ($R'$ independently represents a hydrogen atom or an alkyl group). The above definition also applies to the alkyl unit of an alkylaryl group, an aralkyl group and an alkoxy group. Similarly, this also applies to alkenyl groups and alkinyl group except that they comprise a C-C double bond and a C-C triple bond, respectively.

Unless defined otherwise, the term "aryl group" as used in the present invention refers to an aromatic carbocyclic group with one or more fused rings, which preferably comprises 5 to 14 carbon atoms. The aryl group can optionally comprise one or more substituents (preferably 0 to 3) selected for example from halogen atoms, alkyl groups, alkoxy groups, CN, $NO_2$, $NR'_2$, $COOR'$ and $OR'$ (wherein each $R'$ is independently selected from hydrogen and alkyl). The above definition also applies to the aryl unit of an aralkyl group, an alkylaryl group, an alkenylaryl group, an aralkenyl group, an alkinylaryl group and an aralkinyl group. Preferred examples include a phenyl group and a naphthyl group which can optionally be substituted.

A fused ring or ring system as referred to in the present invention is a ring that shares two carbon atoms with the ring to which it is fused.

For preparing the inventive phosphono-substituted siloxane, a first organosilicon compound of the general formula (I) is used (I)

wherein $R^1$ is selected from a hydrogen atom, a hydroxy group, a linear or branched $C_1$-$C_{20}$ alkyl, linear or branched $C_2$-$C_{20}$ alkenyl, linear or branched $C_1$-$C_{20}$ alkoxy, linear or branched $C_2$-$C_{20}$ alkinyl, aryl, arylalkyl, alkylaryl, arylalkenyl, alkenylaryl, arylalkinyl, alkinylaryl, acyloxy group and a group —$CHR^6$—$PO_3H_2$, $R^2$ and $R^3$ are independently selected from a hydrogen atom, a linear or branched $C_1$-$C_{20}$ alkyl, linear or branched $C_2$-$C_{20}$ alkenyl, linear or branched $C_2$-$C_{20}$ alkinyl, aryl, arylalkyl, alkylaryl, arylalkenyl, alkenylaryl, arylalkinyl and alkinylaryl, $R^4$ is selected from a hydrogen atom, a linear or branched $C_1$-$C_{20}$ alkyl, linear or branched $C_2$-$C_{20}$ alkenyl, linear or branched $C_2$-$C_{20}$ alkinyl, aryl, arylalkyl, alkylaryl, arylalkenyl, alkenylaryl, arylalkinyl, alkinylaryl group and the group —$CHR^6$—$PO_3H_2$,

$R^5$ is selected from a hydrogen atom, a linear or branched $C_1$-$C_{20}$ alkyl, linear or branched $C_2$-$C_{20}$ alkenyl, linear or branched $C_2$-$C_{20}$ alkinyl, aryl, arylalkyl, alkylaryl, arylalkenyl, alkenylaryl, arylalkinyl, alkinylaryl group and the group —$CHR^6$—$PO_3H_2$, Z represents —$(CR^6R^7)_x$— or arylene, $R^6$ and $R^7$ are independently selected from a hydrogen atom, a linear or branched $C_1$-$C_6$ alkyl, linear or branched $C_2$-$C_6$ alkenyl, linear or branched $C_2$-$C_6$ alkinyl, aryl, arylalkyl, alkylaryl, arylalkenyl, alkenylaryl, arylalkinyl and alkinylaryl group, n is an average value and has a value from 1 to 200 (preferably 1 to 100) and x is an integer from 1 to 100.

Preferably, the first organosilicon compound has the formula (Ia)

(Ia)

wherein n is an average value and has a value from 1 to 100.

Depending on the pH value, the first organosilicon compound of formula (I) or (Ia) can also be protonated at the N atom. Thus, whenever reference is made to formula (I) or (Ia) in this application, the protonated species should be encompassed as well.

The first organosilicon compound (I) can for example be obtained by reacting a suitable aminosilane with formaldehyde and phosphoric acid, whereby the phosphoric acid can for example be prepared by controlled hydrolysis of suitable halogenated phosphorus compounds in situ, e.g. from $PCl_3$.

Such a reaction takes place according to the following reaction scheme:

wherein $R'$ carries one or more silane groups.

The first organosilicon compound is reacted with a second organosilicon compound of the general formula (II)

(II)

wherein $Z_1$ represents a spacer or a single bond, $R^8$, $R^9$ and $R^{10}$ are independently selected from H, OH, alkyl, alkenyl, alkinyl, aryl, alkylaryl, aralkyl, aralkenyl, alkenylaryl, aralkinyl, alkinylaryl, acyloxy and alkoxy, with the proviso that at least one of the groups $R^8$, $R^9$ and $R^{10}$ is an alkoxy, acyloxy or OH group, and represents one or more functional groups selected from free-radical polymerizable groups, non-ionic hydrophilic groups, basic groups and combinations thereof.

$R^8$, $R^9$ and $R^{10}$ are preferably independently selected from a hydroxy group, a linear or branched $C_1$-$C_{20}$ alkoxy group, an acyloxy group, a hydrogen atom, a linear or branched $C_1$-$C_{20}$ alkyl, linear or branched $C_2$-$C_{20}$ alkenyl, linear or branched $C_2$-$C_{20}$ alkinyl, aryl, arylalkyl, alkylaryl, arylalkenyl, alkenylaryl, arylalkinyl and alkinylaryl group, with the proviso that at least one of the groups $R^8$, $R^9$ and $R^{10}$ is selected from OH, alkoxy and acyloxy.

$Z_1$ represents a spacer or a single bond. Examples of suitable spacers include aliphatic groups —$CR^6R^7$)$_x$—, wherein $R^6$, $R^7$ and x are as defined above for formula (I), an arylene group, a polyalkylenoxy group or a combination of two or more of the above.

It is especially preferred that $R^8$, $R^9$ and $R^{10}$ be selected from alkoxy groups with 1 to 4 carbon atoms, wherein the C-group can be linear or branched, and alkyl groups with 1 to 4 carbon atoms, or an alkyl group with 1 to 16 carbon atoms, wherein the group can be linear or branched, with the proviso that at least one of the groups $R^8$, $R^9$ and $R^{10}$ (preferably 2 or 3 thereof) represent a $C_{1-4}$ alkoxy group.

It is especially preferred that $Z_1$ is an aliphatic spacer with an average number of carbon atoms of 1 to 16, which may be linear or branched, or a polyethylene glycol with an average degree of polymerization of 1 to 25.

The functional group preferably represents a free-radical polymerizable group such as acrylate, methacrylate, styryl, allyl, or vinyl, or a non-ionic hydrophilic group such as polyethylene oxide with an average degree of polymerization of 1 to 25, hydroxyl or thiol, or a basic group such as a primary, secondary or tertiary amino group, amido, imino, or an urea group; combinations of the above functional groups are possible as well.

The second organosilicon compounds are prepared by way of catalytic hydrosilylation of an olefin and an Si—H compound. The processes are known to the person skilled in the art and are described, inter alia, in W. Noll; Chemistry & Technology of Silicones; Academic Press 1968; E. Plueddeman; Silane Coupling Agents; Plenum New York 1982; and A. E. Pierce; Silylation of Organic Compounds; Pierce Chemical Rockford 1968.

The phosphono-substituted siloxanes of the present invention are prepared from (I) and (II) using known processes.

The preferred reaction of the first organosilicon compound (I) and the second organosilicon compound (II) occurs without any solvent. In this case, it is not necessary to add a catalyst since compound (I) is already acidic and the protons present in the reaction mixture catalyze the reaction of (I) and (II). However, it is also possible to add catalysts; Sn(II) compounds are preferably used for this purpose. These reactions are well known to the person skilled in the art and are for example described in Organosilicon Chemistry I-III, N. Auner, J. Weis, Wiley-VCH.

The reaction mixture is preferably diluted with water.

The preferred reaction temperature is in the range of 15 to 40° C.

The molar ratio of reactants (I) and (II) is not particularly restricted.

The following second organosilicon compounds of formula (II) are especially preferred:

(IIa)

(IIb)

(IIc)

(IId)

(IIe)

(IIf)

As is apparent, formulae (IIi) and (IIj) differ from (IIa) only in the number of methoxy groups at the Si atom; the same variations (i.e. replacement of one or two methoxy groups by CH$_3$) are possible with formulae (IIb) to (IIh), and the resulting compounds also belong to preferred second organosilicon compounds (II).

The phosphono-substituted siloxanes of the present invention can be interpreted as copolymers with units derived from (I) and units derived from (II); they can be random copolymers, alternating copolymers or block copolymers.

According to one embodiment of the present invention, the phosphono-substituted siloxane has the general formula (III)

wherein R$^1$, R$^4$, R$^5$, R$^9$, Z, Z$_1$, and n are as defined above and m and o are independently integers of at least 1. Structure (III) is to be understood as to encompass random copolymers, alternating copolymers or block copolymers.

Structure (III) above represents the case that both R$^8$ and R$^{10}$ react with (I). In case only R$^8$ reacts with I, II becomes an end group.

It has been found that the phosphono-substituted siloxanes of the present invention are suitable both as interlayer material in lithographic substrates and for post-treating developed lithographic printing plates.

The lithographic substrate is a dimensionally stable plate or foil-shaped material. Preferably, a material is used as dimensionally stable plate or foil-shaped material that has already been used as a substrate for printing matters. Examples of such substrates include paper, paper coated with plastic materials (such as polyethylene, polypropylene, polystyrene), a metal plate or foil, such as e.g. aluminum (including aluminum alloys), zinc and copper plates, plastic films made e.g. from cellulose diacetate, cellulose triacetate, cellulose propionate, cellulose acetate, cellulose acetate butyrate, cellulose nitrate, polyethylene terephthalate, polyethylene, polystyrene, polypropylene, polycarbonate and polyvinyl acetate, and a laminated material made from paper or a plastic film and one of the above-mentioned metals, or a paper/plastic film that has been metallized by vapor deposition. Among these substrates, an aluminum plate or foil is especially preferred since it shows a remarkable degree of dimensional stability and is inexpensive. Furthermore, a composite film can be used wherein an aluminum foil has been laminated onto a plastic film, such as e.g. a polyethylene terephthalate film, or paper, or a plastic film onto which aluminum has been deposited by means of vapor deposition.

The lithographic substrate comprises an aluminum oxide layer on at least one side.

The following steps can for example be taken to generate the aluminum oxide layer on the substrates mentioned above:

A metal substrate, in particular an aluminum substrate, is preferably subjected to a treatment consisting of graining (e.g. by brushing in a dry state or brushing with abrasive suspensions, or electrochemical graining, e.g. by means of a hydrochloric acid electrolyte) and anodizing (e.g. in sulfuric acid or phosphoric acid). The aluminum oxide layer can also be applied on the above-mentioned substrates by means of vapor deposition processes.

The details of the above-mentioned substrate pretreatment are known to the person skilled in the art.

An aluminum foil which preferably has a thickness of 0.1 to 0.7 mm, more preferred 0.15 to 0.5 mm, is an especially preferred substrate. It is preferred that the foil be grained (preferably electrochemically) and then show an average roughness of 0.2 to 1 μm, especially preferred 0.3 to 0.8 μm.

According to an especially preferred embodiment, the grained aluminum foil was furthermore anodized. The layer weight of the resulting aluminum oxide is preferably 1.5 to 5 g/m$^2$, especially preferred 2 to 4 g/m$^2$.

For preparing a lithographic substrate according to the present invention, a dimensionally stable substrate as described above is first provided with an aluminum oxide layer and then with an interlayer comprising a phosphono-substituted siloxane according to the present invention.

For this purpose, a solution of the interlayer polymer is prepared, preferably with a concentration of 0.01 to 10 wt.-%, based on the solvent, more preferred 0.05 to 5 wt.-%, particularly preferred 0.1 to 1 wt.-%. This solution is then applied using common coating processes such as e.g. dip coating, roller coating, spray coating, blade coating and coating with a slot coater. The solvent used in this process has a temperature of preferably 20 to 90° C.

The solution can furthermore contain common additives such as thickening agents, surfactants, bactericides, fungicides etc.

If desired, an excess of solution can be removed by means of a doctor blade, a squeeze roll or by rinsing with water (preferably at a temperature of 20 to 80° C.) after a sufficiently long dwell time of the solution of the substrate.

The substrate treated with the solution is then dried using for example a hot-air dryer or an infrared dryer. Drying is preferably carried out at a temperature of 30 to 120° C., especially preferred 40 to 90° C.

The amount of interlayer on the substrate can be determined by a determination of phosphorus using ion chromatography.

The lithographic substrate of the present invention is suitable for the production of all types of lithographic printing plates, i.e. both those produced from positive working precursors and those produced from negative working precursors, whereby the printing plate precursors can either be UV/VIS-sensitive (i.e. sensitive to radiation selected from a wavelength range of 320 nm to 750 nm) or IR-sensitive (i.e. sensitive to radiation selected from a wavelength range of more than 750 nm to 1,600 nm, preferably more than 750 nm to 1,350 nm) or heat-sensitive. The precursors can either be single-layer precursors or precursors having a multi-layer structure.

The radiation-sensitive coating can for example be a negative working UV-sensitive coating on the basis of negative diazo resins as described, inter alia, in EP 0 752 430 B1, a negative working photopolymer layer sensitive to radiation of about 405 nm (see e.g. DE 103 07 451.1), a negative working photopolymer system sensitive to radiation from the visible range of the spectrum (e.g. EP 0 684 522 B1) or a negative working IR-sensitive layer based on free-radical polymerization (e.g. DE 199 06 823 C2).

Furthermore, the radiation-sensitive coating can be a positive working UV-sensitive layer based on quinone diazides and novolaks, as described in U.S. Pat. No. 4,594,306, or a positive working IR-sensitive layer on the basis of a mixture of novolaks and IR dyes (see also EP 0 887 182 B1 and EP 1 101 607 A1).

Furthermore, the printing plate precursor used in the production of the printing plates can be a negative working single-layer IR-sensitive element wherein the radiation-sensitive layer is rendered insoluble in or impenetrable by aqueous alkaline developer upon IR irradiation and preferably comprises
(i) at least one compound which forms an acid upon IR irradiation (in the following also referred to as "latent Bronsted acid"), and
(ii) a component cross-linkable by an acid (in the following also referred to as "cross-linking agent") or a mixture thereof and
optionally
(iii) a binder resin or a mixture thereof.

Such systems are for example described in EP 0 625 728 B1 and EP 0 938 413 B1.

Positive working dual-layer elements comprising, on the hydrophilic surface of the substrate, a first layer soluble in aqueous alkaline developer whose solubility is not changed by IR irradiation, and on top of that layer a top layer insoluble in aqueous alkaline developer which is rendered soluble in or penetrable by the developer upon IR irradiation can also be used as printing plate precursors.

Known principles can be applied for the top layer:
(a) A polymer insoluble in strongly alkaline aqueous developer (pH>11) is used which is rendered soluble in or penetrably by the developer by IR irradiation; such systems are for example described in U.S. Pat. No. 6,352,812.
(b) A polymer soluble in strongly alkaline aqueous developer (pH>11) is used whose solubility is reduced to such a high degree by the simultaneously present solubility inhibitor that the layer is not soluble or penetrable under developing conditions; the interaction between the polymer and the inhibitor is weakened by IR radiation to such a degree that the irradiated (heated) areas of the layer are rendered soluble in or penetrable by the developer. Such systems are for example described in U.S. Pat. No. 6,352,811 and U.S. Pat. No. 6,358,669. It is not necessary that the polymer and the solubility inhibitor be two separate compounds, but polymers can be used which at the same time have a solubility inhibiting effect, such as e.g. the functionalized resins described in US 2002/0,150,833 A1, U.S. Pat. Nos. 6,320,018 B and 6,537,735 B, such as e.g. functionalized novolaks.
(c) A polymer insoluble in aqueous alkaline developer with pH<11 (but soluble at pH>11) is used, which upon IR irradiation becomes soluble in such a developer with pH<11, and the irradiated element is developed with an alkaline developer with pH<11. Such a system is for example described in WO 02/14071.

A lithographic printing plate can for example be produced by means of a process comprising
(a) providing a lithographic substrate,
(b) applying at least one radiation-sensitive composition onto the substrate and drying,
(c) image-wise exposure of the lithographic printing plate precursor obtained in step (b),
(d) removing the non-image areas from the image-wise exposed precursor by means of a developer,
(e) treating the developed printing plate with a solution of a phosphono-substituted siloxane according to the present invention.

The radiation-sensitive composition can be applied to the surface of the substrate by means of common methods such as e.g. spin coating, dip coating, spray coating and coating by means of doctor blades. It is possible to apply the radiation-sensitive composition on both sides of the substrate; however, an application on only one side of the substrate is preferred.

The substrate preferably does not comprise an interlayer; a grained and anodized aluminum foil with an aluminum oxide layer but without an interlayer is especially preferred.

Depending on the sensitizer used in the composition, the printing plate precursor is image-wise exposed to with UV radiation, VIS radiation or IR radiation.

Depending on whether the layer is a positive working radiation-sensitive layer or a negative working radiation-sensitive layer, the exposed or non-exposed areas are subsequently removed with a developer (preferably an aqueous alkaline developer) which results in printing image areas and non-printing background areas.

According to an alternative embodiment, it is also possible to apply the printing oleophilic areas image-wise to the substrate (e.g. by means of inkjet processes, thermo-transfer processes and toner transfer processes) so that image-wise irradiation and developer are no longer necessary.

For the inventive post-treatment of the imaged lithographic printing plate a solution of the phosphono-substituted siloxane of the present invention is prepared, preferably with a concentration of 0.01 to 15 wt.-%, based on the solvent, more preferred 0.1 to 5 wt.-%, and especially preferred 0.3 to 3 wt.-%. This solution is then applied using common coating processes such as e.g. dip coating, roller coating, spray coating, blade coating and coating with a slot coater. The solvent used in this process has a temperature of preferably 20 to 90° C.

In addition to the phosphono-substituted siloxane of the present invention, the solution can furthermore comprise common additives such as thickening agents, surfactants, bactericides, fungicides etc.

If desired, an excess of solution can be removed by means of a doctor blade, a squeeze roll or by rinsing with water (preferably at a temperature of 20 to 80° C.) after a sufficiently long dwell time of the solution of the substrate.

The substrate treated with the solution is then dried for example in the air or by means of a hot-air dryer or an infrared dryer. Drying is preferably carried out at a temperature of 20 to 120° C., especially preferred 20 to 80° C.

If desired, a common gumming process can be carried out after the post-treatment with the phosphono-substituted siloxane of the present invention, e.g. the application of an aqueous solution containing gum arabic by means of common methods (e.g. roller coating).

However, according to an alternative embodiment, the solution of the phosphono-substituted siloxane of the present invention used for the post-treatment can additionally contain gum arabic or another gumming agent so that post-treatment and gumming are carried out in one step.

The present invention is described in more detailed in the following examples; however, they are not intended to restrict the invention in any way.

EXAMPLES

Reference Example

Preparation of the Organosilicon Compound Ia 460 g $H_3PO_3$ (70%) and 660 g HCL (31%) were mixed at room temperature in a 5 L glass vessel, equipped with a stirrer and a thermostat, and stirred for about 10 minutes. Then 1,200 g of a 22.5% aqueous solution of polycondensated 3-aminopropyltrihydroxysilane were added drop-wise over a time period of 3 hours. During that time, the temperature was held between 60 and 70° C. Then the mixture was heated in a pressure reactor to 100 to 109° C. and 166 g paraformaldehyde were slowly added (within 3 h). Then the phosphonomethylation reaction was allowed to proceed for 2 hours at that temperature. Afterwards, liquid was distilled off under atmospheric pressure to a weight loss of 1,300 g in order to reduce the chloride content and remove excess of formaldehyde. The solid content of the remaining high viscous liquid was 50.7 wt %.

After the synthesis, the compound mentioned above was present in an aqueous solution as a free acid and in a polymerizable state.

(Ia)

Result of elemental analysis of the product:

| | |
|---|---|
| C | 18.46% |
| H | 4.92% |
| N | 4.31% |
| P | 19.08% |
| Si | 8.92% |

P/Si ratio = 2.14

The synthesis described above can be used to prepare all the organosilicon compounds I suitable for use in the present invention by adjusting the parameters accordingly.

Another advantageous variant of the synthesis is based on the use of other strong inorganic acids instead of hydrochloric acid, such as e.g. sulfuric acid.

Examples 1 to 8

Synthesis of Inventive Compounds IIIa to IIIh

5 g of the organosilicon compound Ia (prepared according to the Reference Example) were filled into a flask and vigorously stirred at room temperature. During stirring, 1.5 g of the various organosilicon compounds II were slowly added; an exothermic reaction was observed. After 30 minutes of stirring 50 ml water were added which resulted in the formation of a precipitate. After another 2 hours of stirring at 60 to 80° C., almost the entire precipitate had dissolved in the water. The phases were separated by decantation and the solution was used for further tests.

The organosilicon compounds II used and the content of non-volatile components in the resulting solution are listed in Table 1.

TABLE 1

| Example | Compound II used | Content of non-volatile components (%) | Product |
|---|---|---|---|
| 1 | IIa | 4.2 | IIIa |
| 2 | IIb | 3.4 | IIIb |
| 3 | IIc | 2.3 | IIIc |
| 4 | IId | 2.0 | IIId |
| 5 | IIe | 5.6 | IIIe |
| 6 | IIf | 5.0 | IIIf |
| 7 | IIg | 4.3 | IIIg |
| 8 | IIh | 4.6 | IIIh |

3-(Trimethoxysilyl)propylmethacrylate (IIa)
(from Fluka)

3-(N-Styrylmethyl-2-aminoethylamino)propyltrimethoxysilane-hydrochloride (IIb)
(from ABCR)

TABLE 1-continued

| Example | Compound II used | Content of non-volatile components (%) | Product |
|---|---|---|---|

Ureidopropyltrimethoxysilane (IIc)
(from ABCR)

2-[Methoxy(polyethyleneoxy)-propyl]trimethoxysilane (IId)
(from ABCR)

N-(2-Aminoethyl)-3-aminopropyltrimethoxysilane (IIe)
(from ABCR)

N-(Hydroxyethyl)-N-methylaminopropyltrimethoxysilane (IIf)
(from ABCR)

3-Aminopropyltrimethoxysilane (IIg)
(from ABCR)

3-Mercaptopropyltrimethoxysilane (IIh)
(from ABCR)

Comparative Example 1, Production of Substrate 1

Substrate with Polyvinylphosphonic Acid Interlayer

An electrochemically grained (with HCl, average roughness 0.6 μm) and anodized aluminum foil (weight of the oxide layer 3.2 g/m$^2$) was subjected to a post-treatment with an aqueous solution of 1.5 g/l polyvinylphosphonic acid (PVPA) for 10 s at 50° C. resulting in an interlayer consisting of 15 mg/m$^2$ PVPA on the aluminum substrate.

Comparative Example 2, Production of Substrate 2

Substrate without Interlayer

An electrochemically grained (with HCl, average roughness 0.6 μ/m) and anodized aluminum foil (weight of the oxide layer 3.2 g/m$^2$) was produced; no interlayer was applied.

Examples 9 to 32

Substrate with Interlayer According to the Present Invention

The polymer for the interlayer listed in Table 2 was dissolved in water, resulting in a solution whose concentration can be inferred from Table 2. The solution was applied onto an aluminum foil as described in Comparative Example 1 (grained and anodized but without PVPA) by means of a blade coating process, left at room temperature for 30 s, rinsed with water for another 30 s and finally dried for 4 minutes at 88° C. The amount of interlayer polymer was determined by determination of phosphorus by means of ICP; the results can be inferred from Table 2.

Due to a first interaction between alkaline developer and lithographic substrate, the formation of hydrogen bubbles was observed at the aluminum substrate with interlayer. The developer dwell time that passed until the first bubbles were observed was detonated. Goldstar® developer was used as developer, which has a pH value of about 13. The longer the dwell time, the better the aluminum substrate was protected against the developer by the interlayer.

Etch Test

Goldstar® developer was used for this test as well. An aluminum substrate with interlayer in the form of a strip was immersed in a Goldstar® bath such that a length of 4 cm was covered with developer and kept for one minute. The process was repeated, wherein each time 4 cm more were immersed and the longest dwell time was 4 minutes. Then the strip was rinsed with water and dried.

The resistance to the alkaline attack was evaluated visually by comparing an area of the strip that had not been immersed in developer with the areas that had been immersed for 1, 2, 3 and 4 minutes, respectively.

TABLE 2

| Example | Interlayer polymer | Concentration in water (%) | Amount of phosphorus (mg/m$^2$) | Amount of interlayer polymer (mg/m$^2$) | Time until H$_2$ formation(s) | »Etch test« [1] |
|---|---|---|---|---|---|---|
| Comp. 1 | PVPA | 0.15 | — | 15 | 45 | 1 |
| 9 | IIIa | 0.84 | 5.6 | 49 | 55 | 3 |
| 10 | IIIa | 0.42 | 3.7 | 33 | 55 | 3 |
| 11 | IIIa | 0.21 | 1.5 | 13 | 55 | 3 |
| 12 | IIIa | 0.115 | 1.2 | 10 | 55 | 2 |
| 12 | IIIb | 0.68 | 3.8 | 33 | 70 | 5 |

TABLE 2-continued

| Example | Interlayer polymer | Concentration in water (%) | Amount of phosphorus (mg/m²) | Amount of interlayer polymer (mg/m²) | Time until H₂ formation(s) | "Etch test"[1] |
|---|---|---|---|---|---|---|
| 14 | IIIb | 0.34 | 1.8 | 16 | 70 | 4 |
| 15 | IIIb | 0.17 | 1.4 | 12 | 70 | 4 |
| 16 | IIIb | 0.085 | 0.42 | 4 | 60 | 3 |
| 17 | IIIc | 0.46 | 3.3 | 29 | 67 | 5 |
| 18 | IIIc | 0.23 | 1.5 | 13 | 53 | 4 |
| 19 | IIIc | 0.115 | 0.97 | 9 | 55 | 4 |
| 20 | IIIc | 0.0575 | 0.27 | 3 | 49 | 3 |
| 21 | IIId | 0.5 | 2.7 | 24 | 55 | 4 |
| 22 | IIId | 0.2 | 1.2 | 11 | 55 | 3 |
| 23 | IIId | 0.1 | 0.87 | 8 | 50 | 3 |
| 24 | IIId | 0.05 | 0.69 | 6 | 55 | 3 |
| 25 | IIIe | 1.12 | 5.3 | 47 | 52 | 4 |
| 26 | IIIe | 0.56 | 3.3 | 29 | 55 | 3 |
| 27 | IIIe | 0.28 | 1.9 | 17 | 49 | 3 |
| 28 | IIIe | 0.14 | 0.88 | 8 | 47 | 3 |
| 29 | IIIf | 1 | 7.5 | 66 | 70 | 5 |
| 30 | IIIf | 0.5 | 4.0 | 36 | 70 | 4 |
| 31 | IIIf | 0.25 | 2.1 | 19 | 65 | 3 |
| 32 | IIIf | 0.125 | 1.1 | 10 | 55 | 3 |

[1] Visual evaluation of the interlayer after exposure to Goldstar developer:
strong attack after 3 to 4 minutes: 1
clearly visible attack after 4 minutes: 2 (slight improvement)
slight attack after 4 minutes: 3 (clear improvement)
almost no visible attack after 4 minutes: 4 (very clear improvement)
no visible attack after 4 minutes: 5 (excellent improvement)

The results shown in Table 2 show the improvement of the alkaline developer stability of the interlayer according to the present invention compared to a conventional PVPA interlayer.

Examples 33 to 39 and Comparative Examples 3 and 4

Lithographic Printing Plate Precursors with an Interlayer According to the Present Invention and a UV-sensitive Photopolymer Layer A UV-sensitive filtered coating solution as described in Table 3 was applied onto the substrate listed in Table 4 and dried for 4 minutes at 90° C. The dry layer weight of the photopolymer layer was about 1.5 g/m².

The obtained samples were coated with an overcoat by applying an aqueous solution of poly(vinylalcohol) (degree of hydrolysis: 88%); after drying for 4 minutes at 90° C., the overcoat layer had a dry layer weight of about 3 g/m².

The printing plate precursor was exposed with an imagesetter (Andromeda® A750M from Lithotech, equipped with a laser diode emitting at 405 nm with an energy of 30 mW, cw operation). A UGRA digital gray scale V2.4 with defined tonal values (all data was linearized in order to approximately obtain the desired tonal value) was exposed onto the plate precursor described above. Additionally, the sensitivity of the plate was determined using an UGRA offset gray scale 1982 under overall exposure. Immediately after exposure, the plate was heated in an oven for 2 minutes to 90° C.

Then the exposed and thermally treated plate was treated for 30 seconds with a developer solution having a pH value of about 12 and containing KOH as alkaline component and poly(oxyethylene)-2-naphthyl ether.

Then the developer solution was again rubbed over the surface for another 30 seconds using a tampon and then the entire plate was rinsed with water. After this treatment, the exposed portions remained on the plate.

TABLE 3

| | |
|---|---|
| 1.02 g | of a terpolymer prepared by polymerization of 470 parts by weight styrene, 336 parts by weight methyl methacrylate and 193 parts by weight methacrylic acid, 30% solution in propylene glycol monomethylether |
| 0.1 g | Kayamer PM-2 ® (1 mole phosphoric acid esterified with 1.5 moles hydroxyethyl methacrylate) |
| 0.2 | mercapto-3-triazole |
| 3.92 g | of an 80% methyl ethyl ketone solution of a urethane acrylate prepared by reacting Desmodur N 100 ® with hydroxyethyl acrylate and pentaerythritol triacrylate; amount of double bonds: 0.5 double bonds per 100 g when all isocyanate groups have completely reacted with the acrylates containing hydroxy groups |
| 0.45 g | ditrimethylolpropane tetraacrylate |
| 1.25 g | of a dispersion in propylene glycol monomethylether comprising 7.25 wt.-% copper phthalocyanine and 7.25 wt.-% of a polyvinylacetal binder comprising 39.9 mole-% vinyl alcohol groups, 1.2 mole-% vinyl acetate groups, 15.4 mole-% acetal groups derived from acetaldehyde, 36.1 mole-% acetal groups derived from butyric aldehyde and 7.4 mole-% acetal groups derived from 3-formylbenzoic acid |

TABLE 3-continued 0.25 g  2-phenyl-4-(2-chlorophenyl)-5-(4-diethylaminophenyl)-oxazole
0.175 g  2,2-bis(2-chlorophenyl)-4,5,4',5'-tetraphenyl-2'H-[1,2']-biimidazolyl
20 ml  propylene glycol monomethylether
16 ml  methanol
25 ml  methyl ethyl ketone For the assessment of storage stability, the unexposed printing plate precursors were stored for 60 minutes in a 90° C. oven, then exposed and developed as described above (storage stability test).

For the preparation of a printing plate, a precursor produced as described above was exposed and developed, then rinsed with water and subjected to a post-treatment. For this post-treatment, an aqueous gumming solution (0.5% $H_3PO_4$, 6% gum arabic) was applied onto the entire plate, i.e. image areas and non-image areas, with a tampon using standard processes. The thus prepared plate was loaded in a sheet-fed offset printing machine and an abrasive printing ink (Offset S 7184® from Sun Chemical Corp., containing 10% $K_2CO_3$) was used for printing. The results can also be inferred from Table 4.

The relative dot loss was determined as follows:

The term "dot loss" describes the change in the tonal values of a linearized plate during printing. Linearization means that deviations from a predetermined set tonal value (STV) is compensated for by means of RIP software (RIP=raster image processor). The accessible measured values are the tonal values before printing (TVB) and the tonal values after printing (TVA) on the printing form. For determining the dot loss, the linearized tonal values before printing (TVB) are measured. The linearized, developed printing plate described in the present invention is used in a press for 10,000 prints, cleaned and then again subjected to a tonal value examination, which shows the tonal values after printing (TVA). Then the dot loss is calculated using equation 1 integrating all predetermined set tonal values (STV).

$$\text{Dot loss} = \int_0^{100} [TVB - STV] dSTV - \int_0^{100} [TVA - STV] dSTV \quad (1)$$

Ideally, the dot loss should converge toward zero. In other words: The lower the dot loss, the better the plate.

The plate of Comparative Example 3, i.e. a plate with a considerable large dot loss during printing at different tonal values, is used as a reference. The relative loss in tonal value is calculated using equation (2) below:

$$\text{relative dot loss}(\%) = \frac{\text{dot loss (sample)}}{\text{dot loss (reference)}} \cdot 100\% \quad (2)$$

TABLE 4

| Example | Substrate | Interlayer polymer | Amount of interlayer polymer (mg/m$^2$) | Sensitivity [2] | Sensitivity at 405 nm after ageing [3] | Relative dot loss [4] | Number of copies |
|---|---|---|---|---|---|---|---|
| Comparative Ex. 3 | Substrate 2 | PVPA | 15 | 4 | 4 | 100 | >50,000 |
| Comparative Ex. 4 | Substrate 2 | Example 9 of U.S. Pat. No. 5,807,569 | n.d. | 4 | 4 | (toning) | (toning) |
| 33 | Substrate 2 | III a | 10 | 5 | 5 | 2 | >50,000 |
| 34 | Substrate 2 | III b | 16 | 5 | 5 | 2 | >50,000 |
| 35 | Substrate 2 | III b | 4 | 5 | 5 | 7 | >50,000 |
| 36 | Substrate 2 | III c | 9 | 5 | 5 | 8 | >50,000 |
| 37 | Substrate 2 | III c | 3 | 5 | 5 | 15 | >50,000 |
| 38 | Substrate 2 | III d | 11 | 5 | 5 | 35 | >50,000 |
| 39 | Substrate 2 | III d | 6 | 5 | 5 | 59 | >50,000 | n.d. not determined
[2] steps of a UGRA ® gray scale obtained with a fresh plate developed after irradiation
[3] ageing: 60 minutes at 90° C.
[4] The relative dot loss was calculated according to equation (2) above.

Figure 1:
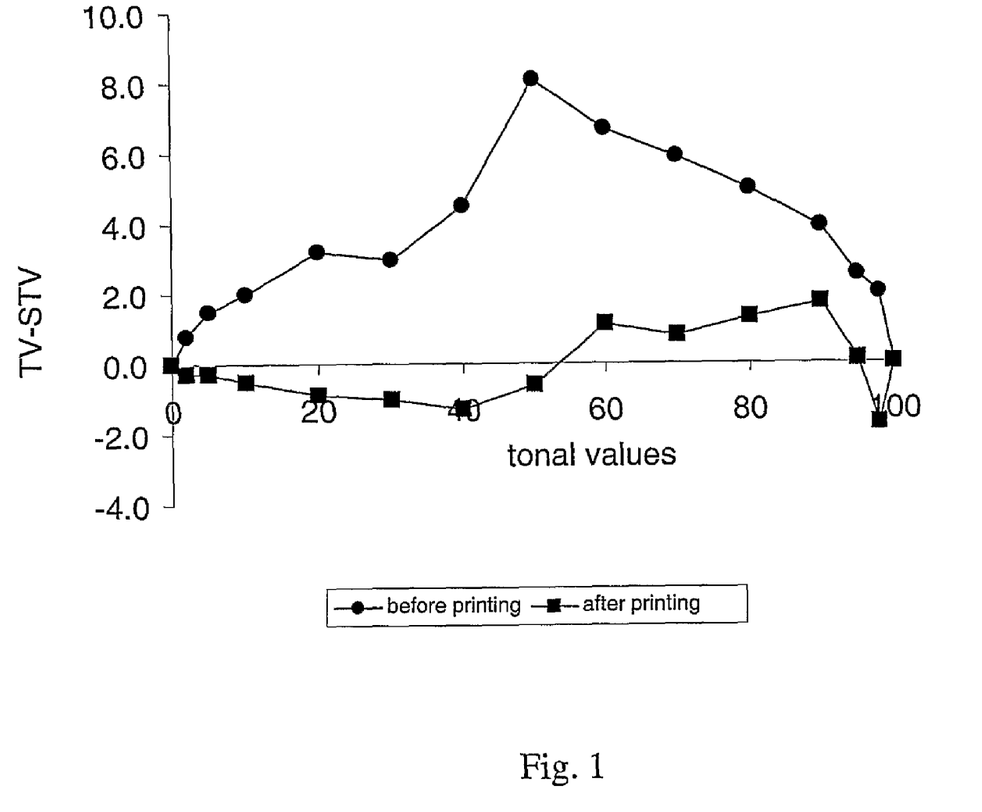
FIGS. 1 and 2 graphically illustrate the dot loss at various tonal values before and after printing as determined in Comparative Example 3 and Example 33, respectively.
Figure 2:
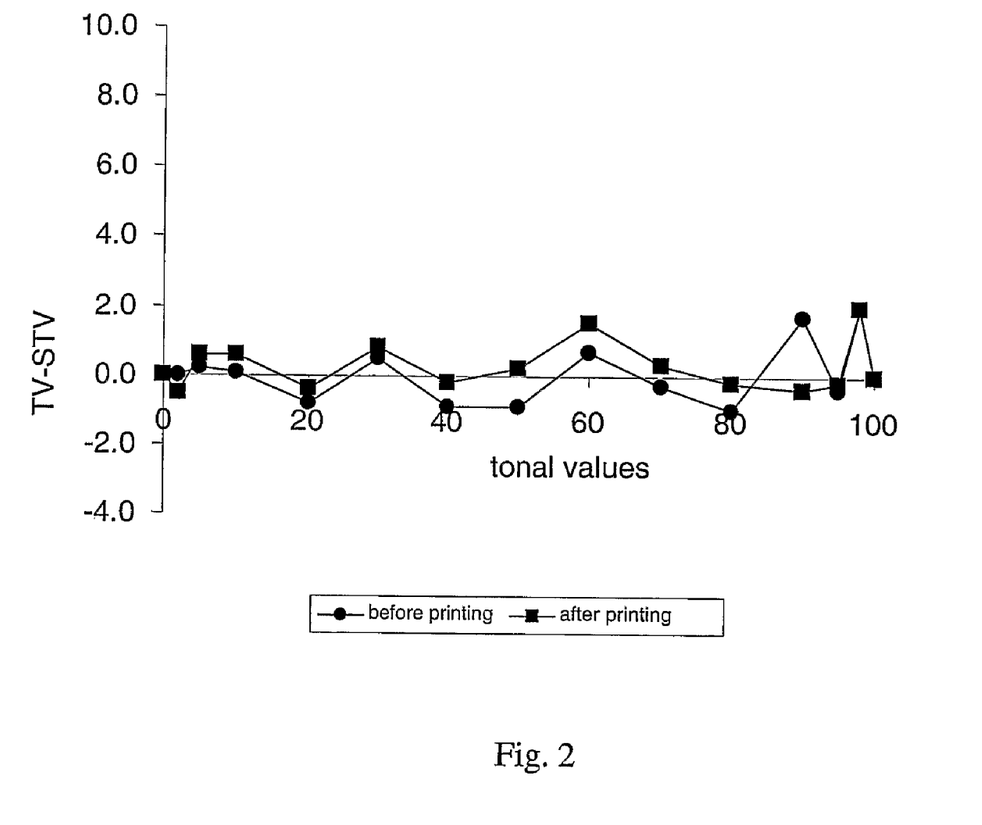

The relative dot loss of Comparative Example 3 and Example 33 is graphically illustrated in FIGS. 1 and 2, respectively. It is obvious that the use of the interlayer according to the present invention resulted in a considerable improvement.

Examples 40 and 41 and Comparative Example 5

Lithographic Printing Plate Precursor with UV-sensitive Photopolymer Layer; without Interlayer; Post-treatment According to the Present Invention Substrate 2 (cf. Comparative Example 2) was coated with the coating solution shown in Table 3 and dried for 4 minutes at 90° C. The dry layer weight of the photopolymer layer was about 1.5 g/m$^2$. The printing plate precursor was image-wise exposed and developed as described in Examples 33 to 39. The developed plate was then subjected to a post-treatment with the material listed in Table 5 (2 wt.-% solution in water in each case) and finalized with the commercially available gumming agent 850S®.

TABLE 5

| Example | Substrate | Post-treatment material[1] | Sensitivity when imaged at 405 nm | Sensitivity after ageing[2] | Relative dot loss[3] | Number of copies |
|---|---|---|---|---|---|---|
| Comp. Ex. 5 | 1 | — | 4 | 4 | 100 | >50,000 |
| 40 | 2 | IIIc | 6 | 6 | 2 | >50,000 |
| 41 | 2 | IIId | 6 | 6 | 5 | >50,000 |

[1] 2% solution in water
[2] ageing: stored for 60 minutes at 90° C.
[3] calculated according to equation (2)

The results shown in Table 5 illustrate that a clear improvement in the dot loss could be achieved without interlayer but with the post-treatment according to the present invention compared to a plate with a conventional interlayer (PVPA) that had not been subjected to a post-treatment according to the present invention.

Examples 42 and 43 and Comparative Example 6

The printing plate precursor was produced by using Substrate 2 as a substrate which was provided with the interlayer listed in Table 6 in the amount given in the table. The precursor was coated with the composition shown in Table 3 analogously to Examples 33 to 39, and provided with the overcoat layer described in these examples. The printing plate precursors were then exposed with a Heidelberg Prosetter equipped with a diode emitting at 405 nm (P=30 mW). The test image was exposed onto the plate at a resolution of 2540 dpi in a 20 µ FM screen (Heidelberg Diamond). The plate was then developed analogously to Examples 33 to 39 and finalized with 850S. After 10,000 prints, the plates of Examples 42 and 43 showed a much lower shift in the tonal values than the plate of Comparative Example 6 which was produced with PVPA as an interlayer. The results are summarized in Table 6.

TABLE 6

| Example | Substrate | Interlayer polymer | Amount of interlayer polymer (mg/m²) | Sensitivity[2] (µJ) | Relative dot loss[3] |
|---|---|---|---|---|---|
| Comp. Ex. 6 | Substrate 2 | PVPA | 15 | 45 | 100 |
| 42 | Substrate 2 | III a | 10 | 30 | 4 |
| 43 | Substrate 2 | III b | 16 | 30 | 2 |

[2] energy required for obtaining two steps of a UGRA ® gray scale
[3] The relative dot loss was calculated according to equation (2) above.

Figure 3:
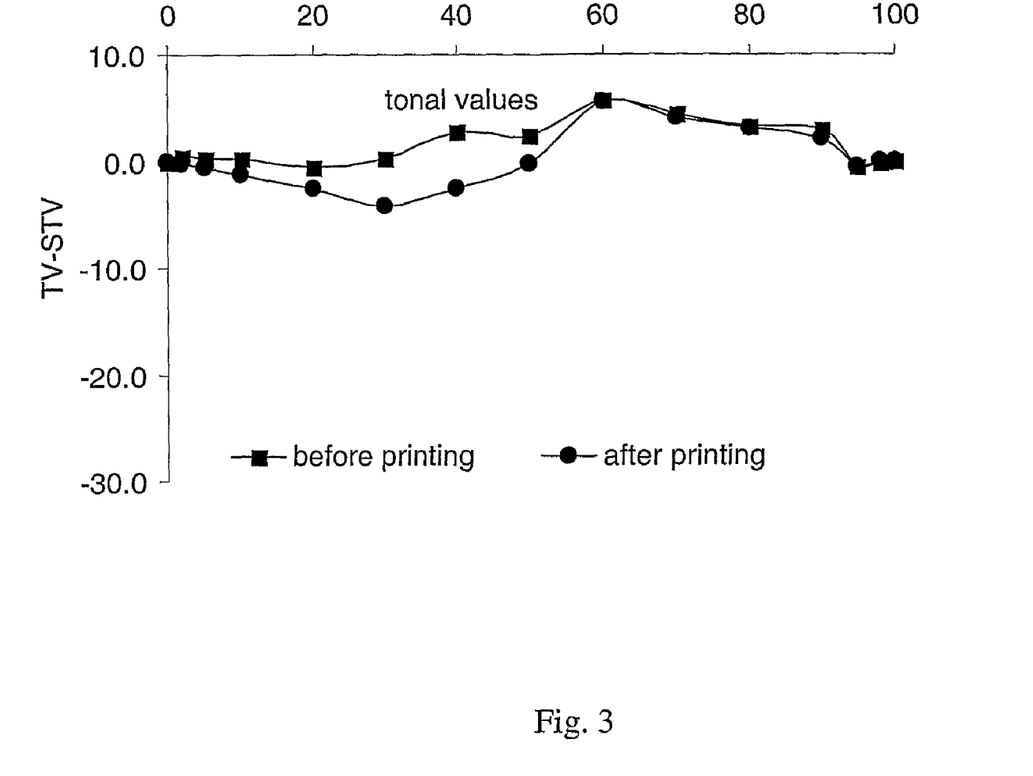
FIGS. 3 and 4 graphically illustrate the dot loss at various tonal values before and after printing as determined in Example 43 and Comparative Example 6, respectively.
Figure 4:
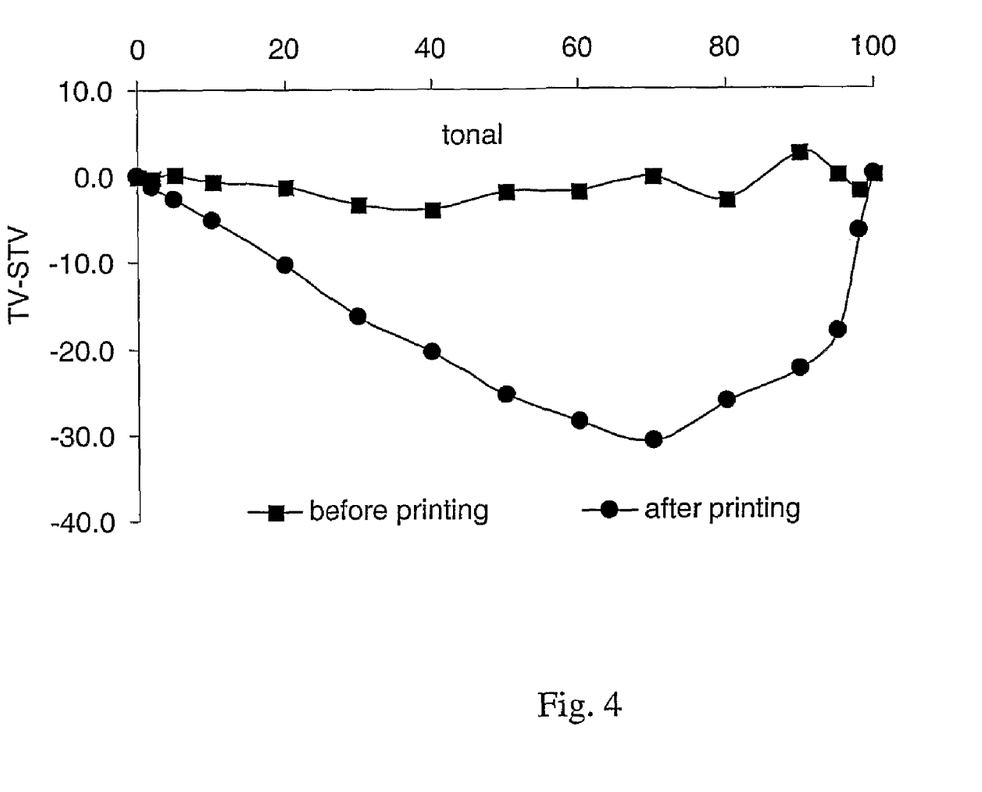

The example shows that even small structural elements as they occur in the 20 µ FM screen show a much more favorable behavior during printing on Substrate 2 than those on a substrate comprising non-reactive groups, such as e.g. PVPA in Comparative Example 6. The relative dot loss of Comparative Example 6 and Example 43 s graphically illustrated in FIGS. 3 and 4, respectively. It can be seen that the interlayer according to the present invention resulted in a considerable improvement since small microelements in particular adhere better to the substrate during printing.

Example 44 and Comparative Examples 7 and 8

Lithographic Printing Plate Precursor with Heat-sensitive Positive Working coating; Different Interlayers on the Substrate A 10% coating solution in Dowanol PM (1-methoxy-2-propanol) is prepared from the components listed in Table 7:

TABLE 7

| Amount | Component |
|---|---|
| 53.5 g | LB 6564 ®, phenol-cresol novolak from Bakelite |
| 35 g | LB 744 ®, cresol novolak from Bakelite |
| 6 g | Silikophen P50X ®, phenylmethylsiloxane from Tego Chemie |
| 0.5 g | KF 654 B Pina, IR absorber from Honeywell |
| 2 g | Crystal violet from Aldrich |
| 1 g | ADS 830 A, IR absorber from American Dye Source |
| 2 g | Cellulose acetate hydrogen phthalate from Aldrich |

After filtration, the coating solution was applied to three different substrates (see Table 8) by means of a wire-wound doctor blade and dried for 90 s at 105° C.; the dry layer weight was about 1.5 g/m².

The printing plate precursors were stacked and conditioned.

Then the printing plate precursors were examined for developer resistance of the coating, possible coloring of the substrate material by dyes/pigments that may be present in the coating (in the following referred to as "staining"), which only becomes visible after developing of the non-image areas, stability of the aluminum oxide and sensitivity. For these purposes, the following tests were carried out, the results of which are summarized in Table 8.

Developer Resistance of the Coating:

First, the optical density of the unexposed precursor ($OD_{unex}$) and the optical density of the substrate ($OD_{sub}$) were determined by means of a Gretag DC19 densitometer. Then the optical density of those areas subjected to the developer Goldstar for 15-30-45-60-90-120-150-180 seconds was determined (OD). The relative loss of the optical density (OD loss) is calculated according to the following formula:

$$\text{"OD loss"} = 1 - \frac{OD - OD_{sub}}{OD_{unex} - OD_{sub}}$$

The OD loss is graphically plotted against the dwell time and the measured values are linearly connected. The point in time where the OD loss is 40% is read off the diagram and noted down.

Staining Test:

A precursor was image-wise exposed with 830 nm and developed with EP26 (AGFA). The resulting printing plate (i.e. the areas where the coating was removed) was compared to the corresponding uncoated substrate with respect to its optical density. When the optical density of the printing plate and the substrate were the same, no staining was observed; however, when the optical density of the printing plate was higher than that of the substrate, staining occurred.

Stability of the Aluminum Oxide Layer (3):

A precursor was immersed in 2-butanone for removing the IR-sensitive coating. After drying, the precursor whose coating had been removed was immersed in Goldstar Plus developer for minutes at a time (a maximum of 4 minutes). By means of visual evaluation, the time was noted until when no attack of the substrate had yet taken place.

Sensitivity:

A precursor was exposed image-wise on a Creo Trendsetter AL 3244 image-setter (830 nm, 9.5 W) (1×1, 2×2 and 4×4 pixel element were exposed onto the precursor) and developed with Goldstar Plus (Mercury MK5 processor; 23° C.; 750 nm/min). The different pixel elements were examined visually; the correct exposure energy was defined as that upon which none of the elements were lighter or darker than the other ones.

TABLE 8

| Example | Substrate | Time until 40% loss of OD [s] | Staining [9] | Oxide stability [min] | Energy mJ/cm$^2$ |
|---|---|---|---|---|---|
| 44 | Example 29 | 88 | – | 3-4 | 270 |
| Comp. Ex. 7 | Comp. Ex. 1 | 80 | + | 2 | 220 |
| Comp. Ex. 8 | Comp. Ex. 2 | 102 | + | 2 | >>270 |

[9] +: staining was observed
–: no staining was observed

The results shown in Table 8 clearly demonstrate that a substrate according to the present invention, i.e. a substrate with an interlayer of a phosphono-substituted siloxane according to the present invention, provides better protection for the aluminum oxide layer, which results in less sludging of the developer bath; furthermore, no staining occurs.

Example 45 and Comparative Examples 9 and 10

Positive Working Lithographic Printing Plate Precursor with UV-sensitive Coating; Different Interlayers on the Substrate A coating solution in a mixture of 2-butanone, methyl-isobutyl acetate and isobutyl acetate (25: 37.5 : 37.5 vol.-%) was prepared from the components listed in Table 9.

TABLE 9

| Amount | Component |
|---|---|
| 76 g | Cresol-formaldehyde novolak |
| 21 g | Sulfonic acid ester of naphthoquinone diazide, bound to cresol-formaldehyde novolak |
| 0.5 g | Triazine B: 1-ethoxy-4-(dichloro-s-triazinyl)-naphthalene |
| 1.2 g | Ethyl violet |

After filtration, the coating solution was applied to 3 different substrates (see Table 10) by means of a wire-wound doctor and dried for 5 minutes at 100° C.; the dry layer weight was about 2 g/m$^2$.

The resulting precursors were used to carry out the staining test as well as the test regarding the stability of the aluminum oxide layer described in connection with Example 47; the results can be inferred from Table 10.

The sensitivity was examined as follows:

A precursor was exposed with a metal halide lamp (MH burner, 5,000 W from Sacks; 480 mJ/cm$^2$; Stouffer® ( gray scale) and developed with the developer 2000 M from Kodak Polychrome Graphics for 15 s and then rubbed with a moist cloth for 5 s; subsequently, the entire plate was rinsed with water. Then the developed plate was blackened with Protection Ink 304 from Kodak Polychrome Graphics; the first step of the gray scale not covered as well as the first solid step of the gray scale were determined. The results can be inferred from Table 10.

TABLE 10

| Example | Substrate | Staining [10] | Oxide stability [min] | First step of gray scale not covered | First solid step of gray scale |
|---|---|---|---|---|---|
| 45 | Example 29 | – | 3-4 | 4 | 9 |
| Comp. Ex. 9 | Comp. Ex. 1 | – | 2 | 4 | 9 |
| Comp. Ex. 10 | Comp. Ex. 2 | + | 2 | 1.5 | 9 |

[10] +: staining was observed
–: no staining was observed

The results shown in Table 10 clearly demonstrate that a substrate according to the present invention, i.e. a substrate with an interlayer of a phosphono-substituted siloxane according to the present invention, provides a much better protection for the aluminum oxide layer than PVPA; no concessions have to be made with respect to staining and sensitivity.

To sum up, it can be said that the phosphono-substituted siloxanes result in considerable improvements both when used as an interlayer and in the post-treatment of developed lithographic printing plates: When used as interlayers, they provide better protection for the aluminum oxide layer both in UV-sensitive and in IR-sensitive plates which markedly reduces sludging of the developer bath. At the same time, a staining of the substrate is prevented in both plate types essentially without compromising sensitivity.

When used in the post-treatment of developed UV plates, the siloxanes provide increased sensitivity, improved ageing resistance and a clearly lower dot loss.

The invention claimed is:

1. Phosphono-substituted siloxane obtainable by reacting (a) an organosilicon compound of the general formula (I)

(I)

wherein
$R^1$ is selected from a hydrogen atom, a hydroxy group, a linear or branched $C_1$-$C_{20}$ alkyl, linear or branched $C_2$-$C_{20}$ alkenyl, linear or branched $C_1$-$C_{20}$ alkoxy, linear or branched $C_2$-$C_{20}$ alkinyl, aryl, arylalkyl, alkylaryl, arylalkenyl, alkenylaryl, arylalkinyl, alkinylaryl, acyloxy group and a group —$CHR^6$—$PO_3H_2$, $R^2$ and $R^3$ are independently selected from a hydrogen atom, a linear or branched $C_1$-$C_{20}$ alkyl, linear or branched $C_2$-$C_{20}$ alkenyl, linear or branched $C_2$-$C_{20}$ alkinyl, aryl, arylalkyl, alkylaryl, arylalkenyl, alkenylaryl, arylalkinyl, and alkinylaryl group, $R^4$ is selected from a hydrogen atom, a linear or branched $C_1$-$C_{20}$ alkyl, linear or branched $C_2$-$C_{20}$ alkenyl, linear or branched $C_2$-$C_{20}$ alkinyl, aryl, arylalkyl, alkylaryl, arylalkenyl, alkenylaryl, arylalkinyl, alkinylaryl group and the group —$CHR^6$—$PO_3H_2$, $R^5$ is selected from a hydrogen atom, a linear or branched $C_1$-$C_{20}$ alkyl, linear or branched $C_2$-$C_{20}$ alkenyl, linear or branched $C_2$-$C_{20}$ alkinyl, aryl, arylalkyl, alkylaryl, arylalkenyl, alkenylaryl, arylalkinyl, alkinylaryl group and the group —$CHR^6$—$PO_3H_2$, Z represents —$(CR^6R^7)x$- or arylene, $R^6$ and $R^7$ are independently selected from a hydrogen atom, a linear or branched $C_1$-$C_6$ alkyl, linear or branched $C_2$-$C_6$ alkenyl, linear or branched $C_2$-$C_6$ alkinyl, aryl, arylalkyl, alkylaryl, arylalkenyl, alkenylaryl, arylalkinyl and alkinylaryl group, n is an average value and has a value from 1 to 200 and
x is an integer from 1 to 100;
and
(b) a siloxane of the general formula (II)

(II)

wherein
$Z_1$ represents a spacer or a single bond,
$R^8$, $R^9$ and $R^{10}$ are independently selected from H, OH, alkyl, alkenyl, alkinyl, aryl, alkylaryl, aralkyl, aralkenyl, alkenylaryl, aralkinyl, alkinylaryl, acyloxy and alkoxy, with the proviso that at least one of the groups $R^8$, $R^9$ and $R^{10}$ is an alkoxy, acyloxy or OH group,
and represents one or more functional groups selected from free-radical polymerizable groups, non-ionic hydrophilic groups, basic groups and combinations thereof.

2. Phosphono-substituted siloxane according to claim 1, wherein the organosilicon compound has the general formula (Ia) wherein n is an average value and has a value from 1 to 100

(Ia)

3. Phosphono-substituted siloxane according to claim 1, wherein the siloxane of general formula (II) is selected from (IIa)

-continued

4. Phosphono-substituted siloxane according to claim 1, characterized by the general formula (III)

wherein $R^1$, $R^4$, $R^5$, $R^9$, Z, $Z_1$, (FG)

and n are as defined in claim 1,
m is an integer of at least 1 and
o is an integer of at least 1.

5. Process of using a phosphono-substituted siloxane as defined in claim 1 comprising treating an imaged lithographic printing plate with a solution of the phosphono-substituted siloxane.

6. Lithographic substrate comprising
(a) a dimensionally stable plate- or foil-shaped substrate,
(b) an aluminum oxide layer provided on at least one side of the substrate (a), and
(c) an interlayer applied onto the aluminum oxide layer comprising a phosphono-substituted siloxane as defined in claim 1.

7. Lithographic substrate according to claim 6, wherein the substrate (a) is an aluminum foil or plate, a laminated material made from a plastic film or paper and aluminum foil or a plastic film onto which aluminum has been deposited by means of vapor deposition.

8. Lithographic substrate according to claim 6, wherein the layer weight of the aluminum oxide layer is 1.5 to 5 $g/m^2$.

9. Lithographic printing plate precursor comprising
(a) a lithographic substrate as defined in claim 8 and
(b) one or more radiation-sensitive layers.

10. Printing plate precursor according to claim 9, wherein the radiation-sensitive layer is a positive working layer.

11. Printing plate precursor according to claim 9, wherein the radiation-sensitive layer is a negative working layer.

12. Printing plate precursor according to claim 9, wherein the radiation-sensitive layer is a UV-sensitive layer sensitive to radiation of a wavelength selected from the range of 320 to 750 nm.

13. Printing plate precursor according to claim 9, wherein the radiation-sensitive layer is an IR-sensitive layer sensitive to radiation of a wavelength selected from the range of 750 to 1,600 nm.

14. Imaged lithographic printing plate comprising image areas and non-image areas on a substrate, characterized in that the image areas and non-image areas are partially or completely covered with a layer comprising a phosphono-substituted siloxane as defined in claim 1.

15. Printing plate according to claim 14, wherein the substrate is an aluminum foil or plate, a laminated material made from a plastic film or paper and aluminum foil or a plastic film onto which aluminum has been deposited by means of vapor deposition.

16. Printing plate according to claim 14, wherein the substrate comprises an aluminum oxide layer.

17. Printing plate according to claim 14, wherein the substrate does not comprise an interlayer.

* * * * *

UNITED STATES PATENT AND TRADEMARK OFFICE
CERTIFICATE OF CORRECTION

PATENT NO. : 7,524,613 B2
APPLICATION NO. : 11/813678
DATED : April 28, 2009
INVENTOR(S) : Baumann et al.

Page 1 of 1

It is certified that error appears in the above-identified patent and that said Letters Patent is hereby corrected as shown below:

In Column 25, line 42, delete "alkinyl," and insert -- alkynyl --.
In Column 25, line 43, delete "arylalkinyl, alkinylaryl," and insert -- arylalkynyl, alkynylaryl, --.
In Column 25, line 48, delete "alkinyl," and insert -- alkynyl --.
In Column 25, line 49,
    delete "arylalkinyl, and alkinylaryl" and insert -- arylalkynyl, and alkynylaryl, --.
In Column 25, line 53, delete "alkinyl," and insert -- alkynyl, --.
In Column 25, lines 54-55,
    delete "arylalkinyl, alkinylaryl," and insert -- arylalkynyl, alkynylaryl, --.
In Column 25, line 58, delete "alkinyl," and insert -- alkynyl, --.
In Column 25, lines 59-60,
    delete "arylalkinyl, alkinylaryl," and insert -- arylalkynyl, alkynylaryl, --.
In Column 25, lines 65-66, delete "alkinyl," and insert -- alkynyl, --.
In Column 25, line 66,
    delete "arylalkinyl and alkinylaryl" and insert -- arylalkynyl, and alkynylaryl --.
In Column 26, line 22, delete "alkinyl," and insert -- alkynyl, --.
In Column 26, line 23,
    delete "aralkinyl, alkinylaryl," and insert -- arylalkynyl, alkynylaryl, --.

Signed and Sealed this
Twenty-sixth Day of March, 2013

Teresa Stanek Rea
*Acting Director of the United States Patent and Trademark Office*